(12) United States Patent
Leung et al.

(10) Patent No.: US 7,231,142 B1
(45) Date of Patent: Jun. 12, 2007

(54) HOT AND COLD BEVERAGE MAKER

(75) Inventors: Chi Wah Leung, Hong Kong (CN);
Chi Chung Fung, Hong Kong (CN);
Shek Chuen Luk, Hong Kong (CN)

(73) Assignee: Simatelex Manufactory Co., Ltd., Hong Kong Sar (CN)

( * ) Notice: Subject to any disclaimer, the term of this patent is extended or adjusted under 35 U.S.C. 154(b) by 0 days.

(21) Appl. No.: 11/355,887

(22) Filed: Feb. 17, 2006

(51) Int. Cl.
*F24H 1/18* (2006.01)
(52) U.S. Cl. .......................................... 392/441; 99/483
(58) Field of Classification Search ...................... None
See application file for complete search history.

(56) References Cited

U.S. PATENT DOCUMENTS 5,970,847 A * 10/1999 Saltzman ..................... 99/287

2004/0211848 A1 * 10/2004 Mulle et al. ................... 241/36

* cited by examiner

*Primary Examiner*—Thor S. Campbell
(74) *Attorney, Agent, or Firm*—Leydig, Voit & Mayer, Ltd.

(57) ABSTRACT

A hot and cold beverage maker has a housing having a base and an upper body. A water reservoir, brew basket and water heater are located in the housing. There is a water passage from the reservoir thorough the water heater to the brew basket for delivering heated water to the brew basket. In the base is a cradle for supporting a beverage jug beneath the brew basket outlet. The cradle has a rotary coupling for engaging a corresponding coupling of a beverage jug placed in the cradle. The beverage maker may also include a beverage jug having a base with a rotary blade in the jug connected to a jug coupling at the jug base.

14 Claims, 8 Drawing Sheets

HOT AND COLD BEVERAGE MAKER

FIELD OF THE INVENTION

The present invention relates to beverage makers and in particular to hot and cold beverage makers.

BACKGROUND TO THE INVENTION

Partially frozen beverages, often called slushies, smoothies or ice beverages, are very popular. They are usually a mixture of ice and some flavored beverage, like coffee, fruit juice, tea, chocolate etc.

Making a partially frozen beverage sometimes requires the preparation of a hot flavored beverage, such as tea, coffee and the like, first. This requires two machines, a hot beverage maker and a blender. These machines occupy a lot of countertop space and the process of transferring the hot beverage to the blender is troublesome and can easily result in an accident.

OBJECT AND SUMMARY OF THE INVENTION

It is an object of the present invention to overcome or substantially ameliorate the above disadvantage and/or more generally to provide a hot and cold beverage maker that can be used to make both hot beverages and cold blended beverages, and more particularly to make cold versions of traditionally hot beverages such as ice tea, ice coffee or ice chocolate.

There is disclosed herein a hot and cold beverage maker as set out in the claims. Further aspects of the invention will become apparent from the following description.

BRIEF DESCRIPTION OF THE DRAWINGS

A preferred form of the present invention will now be described by way of example only and with reference to the accompanying drawings, wherein.

DETAIL DESCRIPTION OF THE PREFERRED EMBODIMENT

Figure 1:
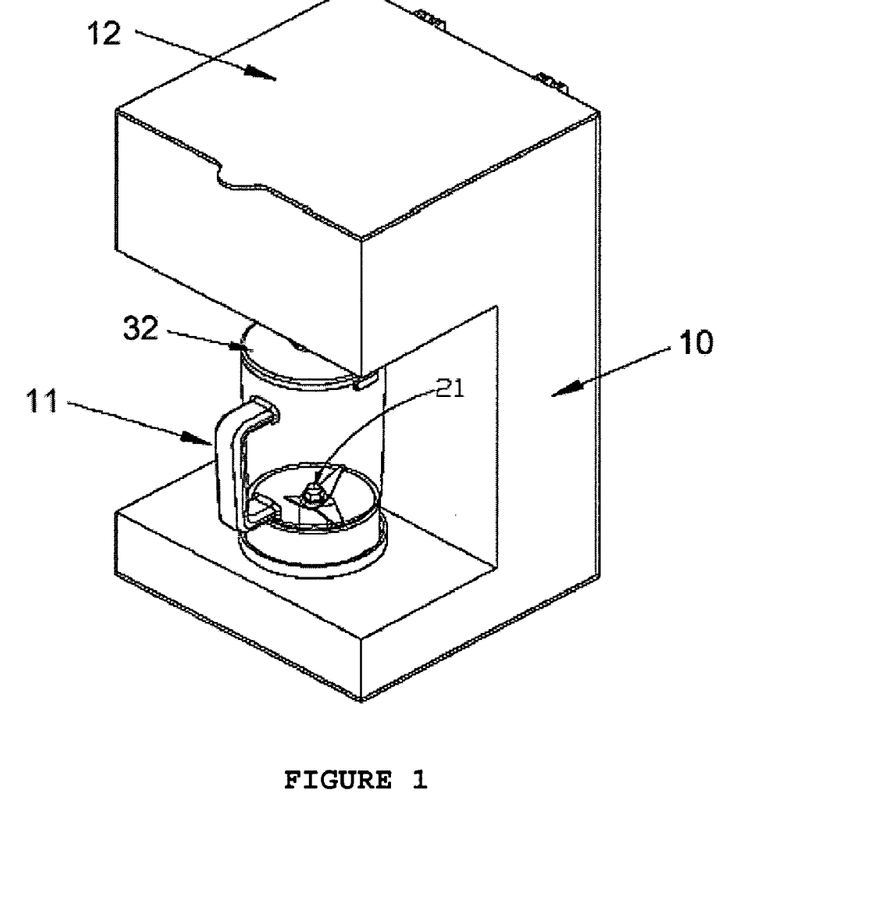
FIGS. 1 and 2 are perspective illustrations of a hot and cold beverage maker according to the invention.
Figure 2:
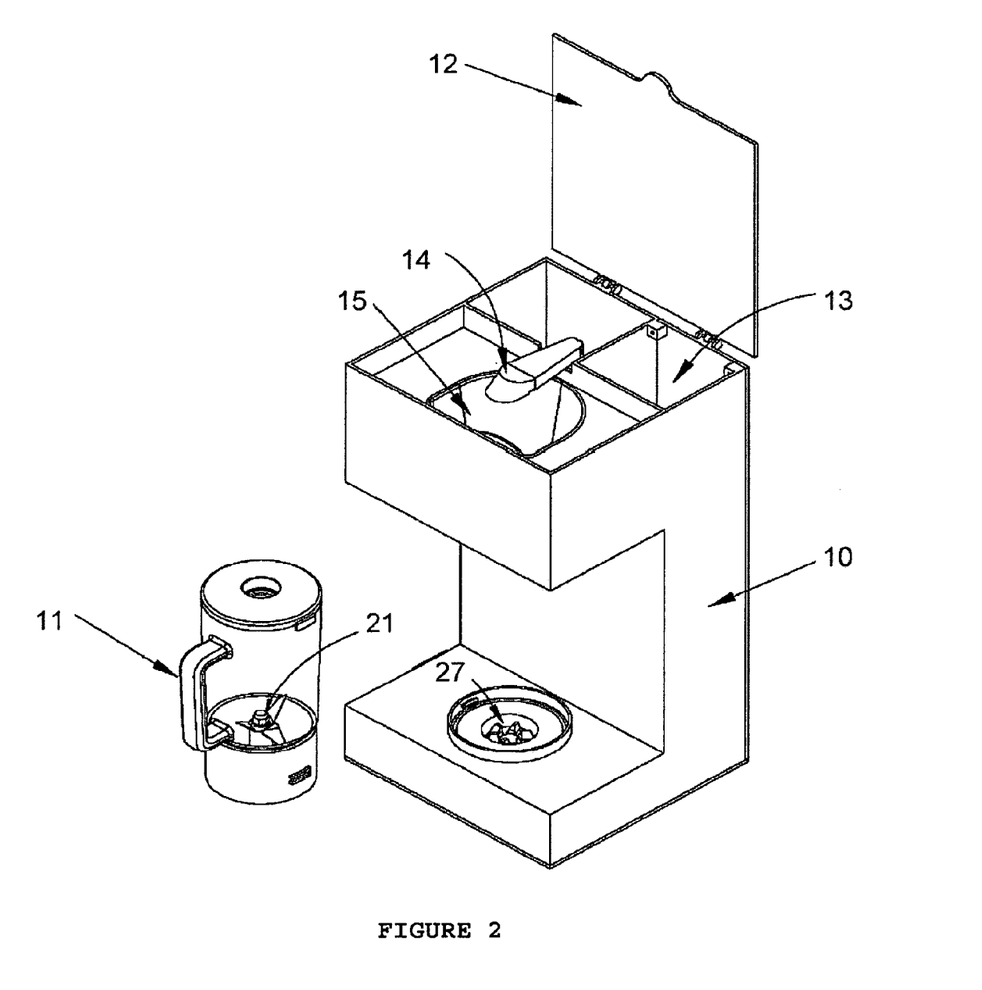
Figure 4:
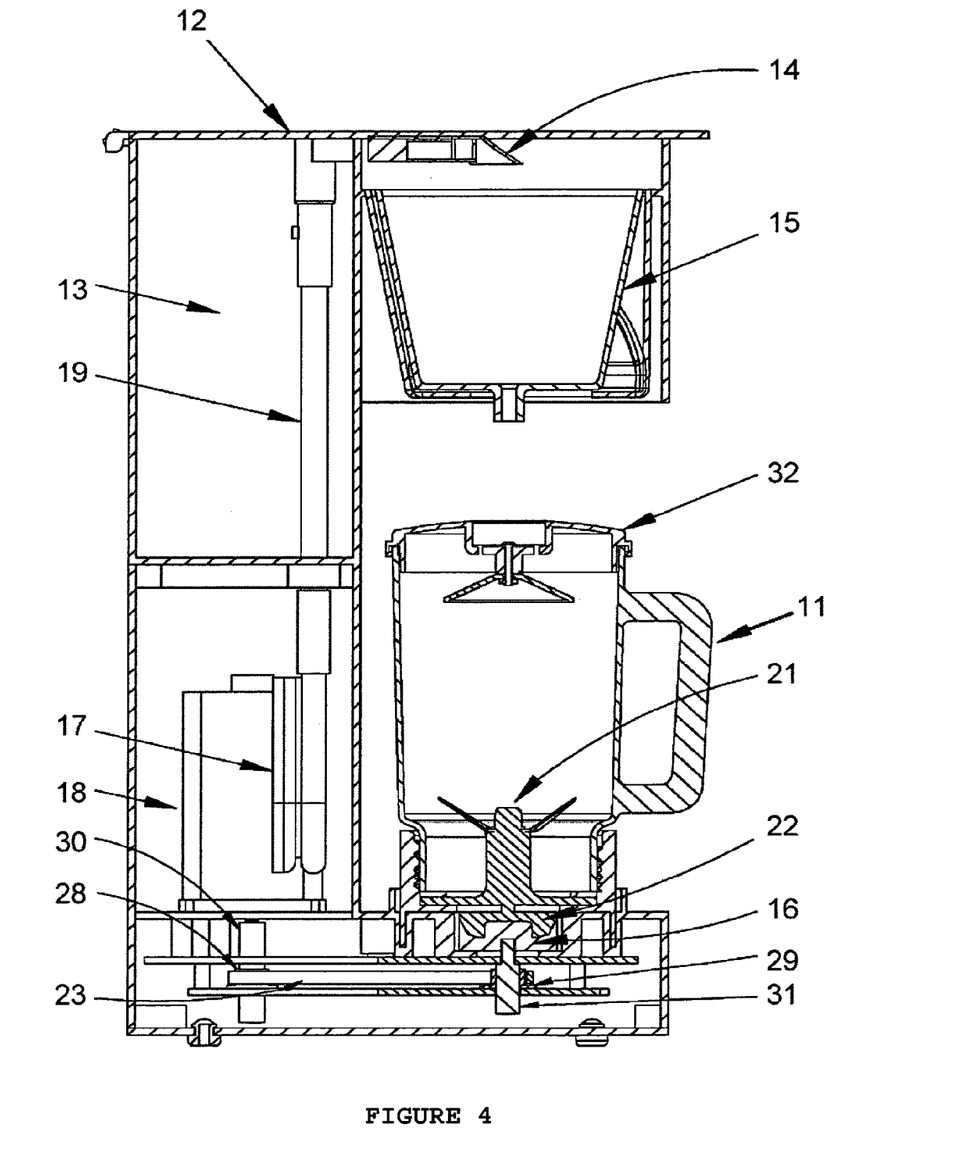
FIG. 4 is a sectional schematic illustration of the beverage maker.

In FIGS. 1, 2 and 4 there is depicted a preferred embodiment of a hot and cold beverage maker comprising a housing 10 having a lower base portion for supporting a beverage jug 11, a vertical trunk portion extending from the base and a head portion. Within the trunk portion are a water reservoir 13 and a water heater 17. A spreader 14 and brew basket 15 are located in the head portion above the beverage jug 11. The head has a pivoting lid 12 to allow the reservoir 13 to be filled. A water passage 19 is provided for delivering water from the reservoir 13 through the water heater 17 to the spreader 14 to be heated and discharged into the brew basket 15. An outlet in the bottom of the brew basket allows water to flow from the brew basket 15 into the jug 11 thought an inlet opening in the jug lid 32. This arrangement is substantially identical to known 'filter' coffee makers and its construction is within the capabilities of a person skilled in the art. In use dry beverage ingredients such as ground coffee beans, tea leaves, chocolate powder etc are placed in the brew basket 15, the reservoir 13 is filled with water and the heater 17 activated to brew hot coffee or tea, as the case may be, which fills the jug 11.

In the current device a blender blade 21 is provide in the base of the jug 11. The blade 21 is located in a spindle attached to a jug drive coupling 22 beneath the base of the jug 11. The base of the housing is provided with a cradle for receiving the jug 11.

The cradle has a second complementary coupling 16 mounted on a rotary spindle 31 that engages with the jug coupling 22 when the jug 11 is placed in the cradle. A motor 18 is located within the casing 10 and has a drive pulley 28 on its output shaft. The drive pulley is connected to a driven pulley 29 by a drive belt 23. The driven pulley 29 is located on the cradle spindle 31 to rotate the complementary coupling 16 when the motor is operated. When the jug 11 is in the cradle of the device beverages in the jug 11 can be blended by activation of the motor 18.

Figure 3:
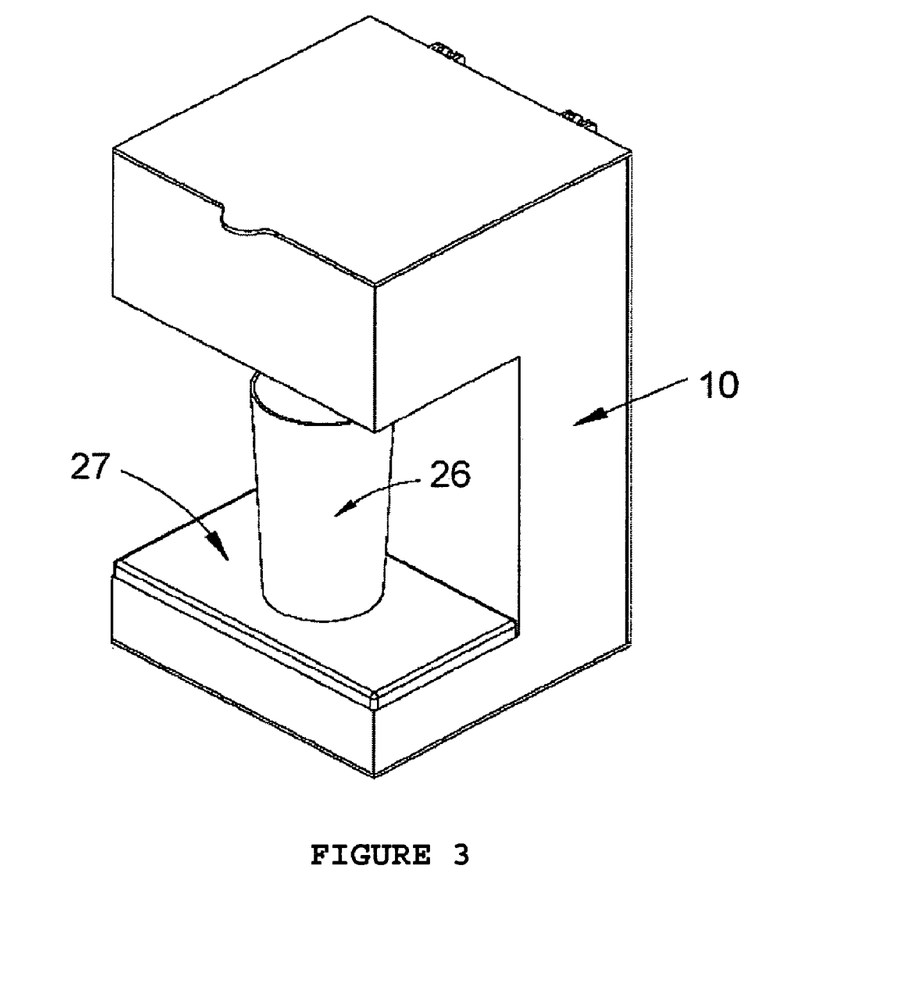
FIG. 3 is a perspective illustration of an alternative embodiment of the beverage maker.

The above hot and cold beverage maker can be used to make both hot beverages such as tea, coffee and chocolate or cold blended beverages such as milkshakes and smoothies. FIG. 3 shows an embodiment of the beverage maker with a regular coffee maker jug 26 for making the former mentioned hot beverages. A cover plate or tray (not shown) is provided for placing over the cradle to support the regular jug 26, or even a drinking cup or mug.

More particularly thought the hot and cold beverage maker can be used to make cold versions of traditionally hot beverages such as ice tea or ice coffee or ice chocolate. For this purpose firstly the hot beverage, say coffee, is made in the manner mentioned above. When a quantity of coffee has been brewed, ice cubes, and if necessary sweetener, are added to the jug and the motor activated to blend the contents to make an ice coffee drink. The preferred embodiment of the invention includes an electronic controller having an ice beverage mode for automatically perform the brew and blend functions sequentially. A correct quantity of water and coffee grounds are added to the reservoir and brew basket respectively, and ice cubes are added to the jug. The controller activates the water heater to brew coffee. A temperature sensor on the water heater senses when the temperature rises indicating that the reservoir is empty. The water heater is then turned off and the brew cycle ends. The controller then enters a blend cycle. To achieve optimum results the controller activates the motor in short pulses to blend the ice and hot beverage into ice slush. At the end of the blend cycle the controller sounds a series of beeps to indicate that the beverage is ready.

Figure 7:
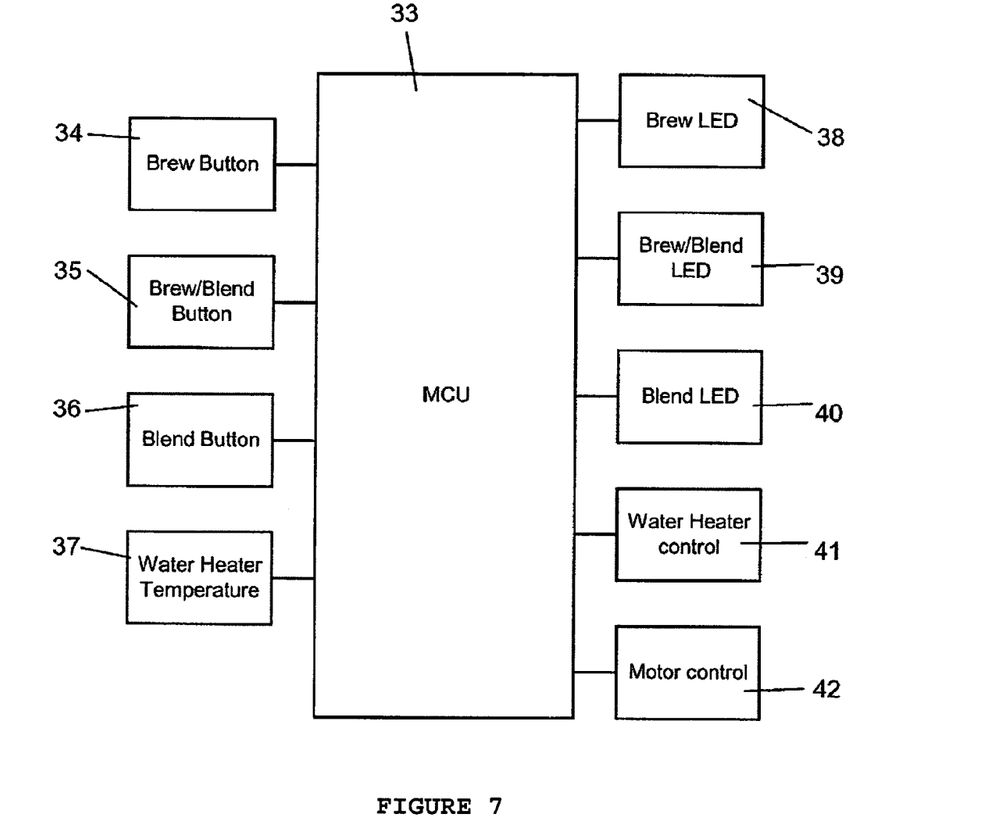
FIG. 7 is a block diagram of a control arrangement of the beverage maker.

FIG. 7 illustrates a control arrangement of the hot and cold beverage maker. Automated control is achieved by a machine control unit (MCU) 33 connected to various inputs and outputs. Inputs included three user input buttons for brew only 34, combination brew & blend 35 and blend only 36 selection and a water heater temperature sensor input 37. Outputs included light emitting diode (LED) indicators for brew only 38, combination brew & blend 39 and blend only 40, as well as on/off water heater control 41 and on/off motor control 42.

If either of the brew only 34 or blend only 36 buttons are pressed the corresponding indicator LED illuminates and the hot and cold beverage maker acts as a coffee maker or blender in known manner.

When the brew/blend button 35 is pressed the hot and cold beverage maker enters an automated cycle for making a partially frozen blended beverage. The following discussion relates to operation of this automated brew & blend cycle.

Figure 8:
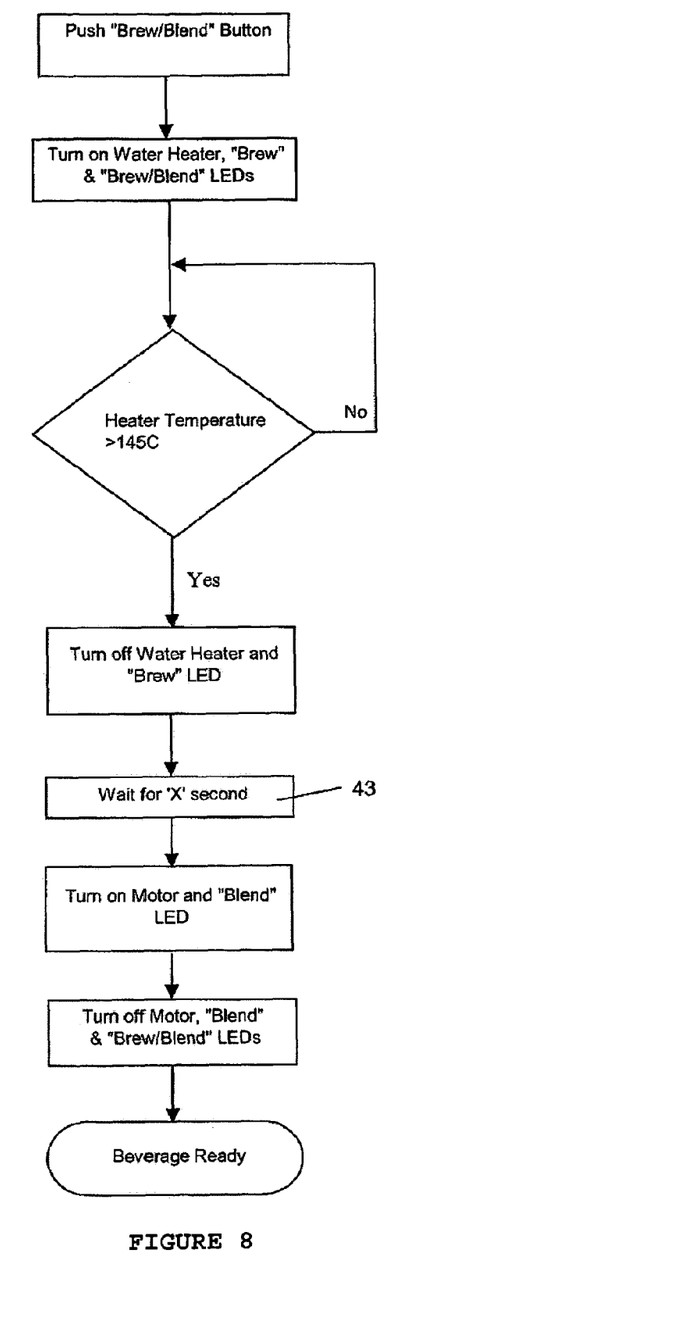
FIG. 8 is flowchart of the operation of the beverage maker.

The user first places ingredients for the beverage flavor in the brew basket 15 and fills the water reservoir 13 with water. Crushed or cubed ice is placed in the jug 11 and the jug 11 located on the base cradle. Referring to FIG. 8 the user pushes the brew/blend button 35. The MCU 33, in response to this input, turns on the brew LED 38, the brew/blend LED 39 and the water heater 17. The device began brewing the flavored beverage while the MCU 33 monitors the water heater temperature via sensor input 37. When the water heater temperature rises to about 145 degrees, indicating the end of the brew cycle, the MCU 33 turns off the brew LED 38 and water heater 17. The brew/blend LED 39 is left on. Before entering the blend sequence the MCU 33 enters a rest period 43 for a predetermine time, say 30 seconds. At the end of the rest period 43 the beverage and ice in the jug 11 are blended by the MCU 33 turning on the blend LED 40 and pulsing the motor 18 on and off. At the end of the blend sequence the motor 18, blend LED 40 and brew/blend LED 39 are turned off. The automatic cycle is finished.

It should be appreciated that modifications and/or alternations obvious to those skilled in the art are not to be considered as beyond the scope of the present invention. For example, FIGS. 5 and 6 illustrate embodiments of the beverage maker that use alternative means to drive the blending blade.

Figure 5:
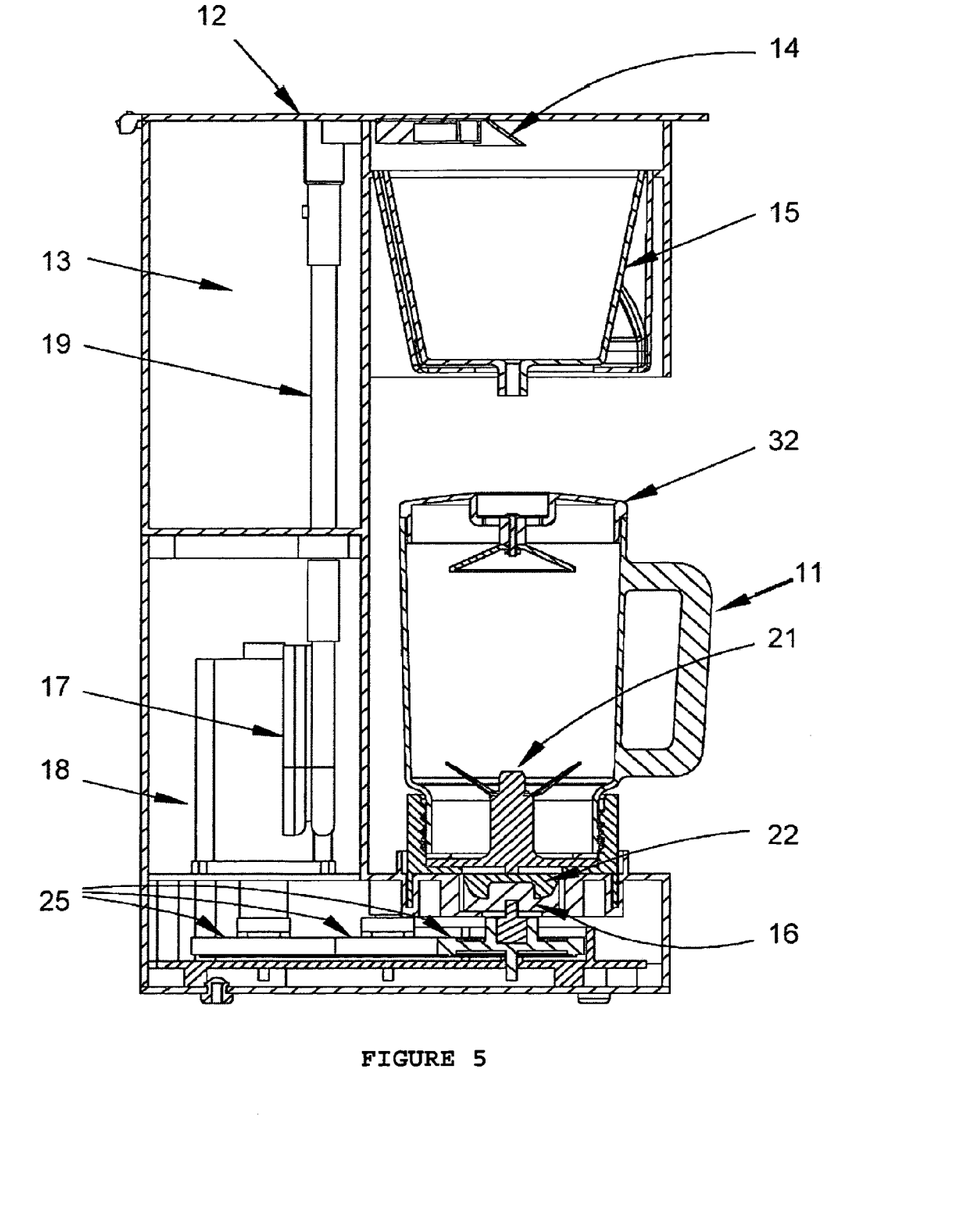
FIGS. 5 and 6 are sectional schematic illustrations of alternative embodiments of the beverage maker.
Figure 6:
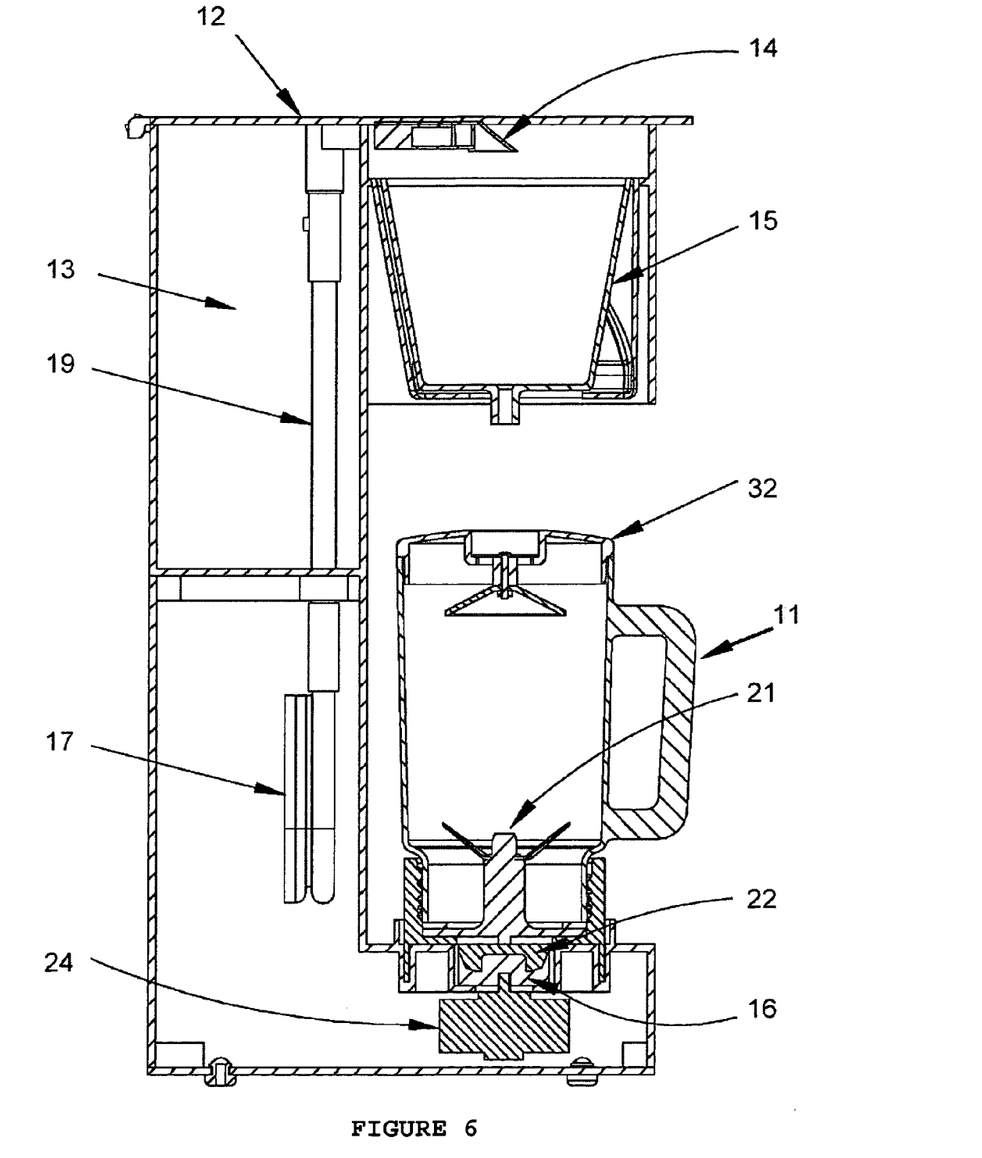

The embodiment in FIG. 5 uses a gear configuration. Rather than pulleys 28, 29 and belt 23 a series of gears 25 are used to transfer rotation of motor shaft 30 to coupling spindle 31. The embodiment in FIG. 6 has a motor arranged beneath the cradle with the driven coupling located directly on the motor shaft.

What is claimed is:

1. A hot and cold beverage maker for use with a beverage jug having a base with a rotary blade in the beverage jug and connected to a coupling at the base of the beverage jug, the beverage maker comprising:
   a housing having a base and an upper body,
   a water reservoir in the housing,
   a brew basket in the upper body having a water outlet for discharge of a brewed beverage,
   a water heater,
   a water passage from the reservoir through the water heater to the brew basket for delivering heated water to the brew basket,
   a cradle on the base of the housing for supporting a beverage jug beneath the brew basket outlet, and
   a rotary coupling in the cradle for engaging a corresponding coupling of a beverage jug placed in the cradle.

2. The beverage maker of claim 1 further comprising a beverage jug having a base with a rotary blade in the beverage jug and connected to a beverage jug coupling at the base of the beverage jug.

3. The beverage maker of claim 1 further comprising a motor in the base of the housing for rotating the rotary coupling.

4. The beverage maker of claim 3 further comprising a pulley and belt driving system connected between the motor and the rotary coupling.

5. The beverage maker of claim 3 further comprising a gear chain driving system connected between the motor and the rotary coupling.

6. The beverage maker of claim 3, wherein the rotary coupling is directly connected to the motor.

7. The beverage maker of claim 2 further comprising a controller programmed to energize the water heater until a hot beverage is prepared, and, when the hot beverage is prepared, to activate the motor.

8. The beverage maker of claim 7, wherein the controller activates the motor by turning the motor on and off in a series of pulses.

9. The beverage maker of claim 7, wherein the controller has a timer for determining when a hot beverage is prepared.

10. The beverage maker of claim 7, wherein the controller is programmed to energize the water heater and to activate the motor independently for, alternatively, brewing a hot beverage and blending contents of the beverage jug when the beverage jug engages the rotary coupling in the cradle.

11. The beverage maker of claim 2 further comprising:
    a temperature sensor on the water heater for sensing a rise in temperature of the water heater, indicating that the water reservoir is empty, and
    a controller communicating with the temperature sensor and programmed to energize the water heater until the rise in temperature of the water heater is sensed, and, in response, to turn off the water heater and, thereafter, to activate the motor.

12. The beverage maker of claim 11, wherein the controller activates the motor by turning the motor on and off in a series of pulses.

13. The beverage maker of claim 11, wherein the controller is programmed to delay activation of the motor after turning off the water heater.

14. The beverage maker of claim 11, wherein the controller is programmed to energize the water heater and to activate the motor independently for, alternatively, brewing a hot beverage and blending contents of the beverage jug when the beverage jug engages the rotary coupling in the cradle.

* * * * *